(12) United States Patent
Soroca (10) Patent No.: US 8,171,009 B2
(45) Date of Patent: May 1, 2012

(54) METHOD AND SYSTEM FOR PERFORMING A SEARCH ON A NETWORK

(75) Inventor: Adam Soroca, Cambridge, MA (US)

(73) Assignee: Lycos, Inc., Waltham, MA (US)

( * ) Notice: Subject to any disclaimer, the term of this patent is extended or adjusted under 35 U.S.C. 154(b) by 240 days.

(21) Appl. No.: 12/556,046

(22) Filed: Sep. 9, 2009

(65) Prior Publication Data

US 2009/0327287 A1 Dec. 31, 2009

Related U.S. Application Data

(63) Continuation of application No. 11/590,248, filed on Oct. 31, 2006, now Pat. No. 7,606,809.

(60) Provisional application No. 60/732,435, filed on Nov. 1, 2005.

(51) Int. Cl.
*G06F 7/00* (2006.01)
*G06F 17/30* (2006.01)

(52) U.S. Cl. ........ 707/706; 707/709; 707/748; 707/770; 715/234; 715/237

(58) Field of Classification Search .................. 707/706, 707/709, 748, 770; 715/234, 237
See application file for complete search history.

(56) References Cited

U.S. PATENT DOCUMENTS

| | | | |
|---|---|---|---|
| 6,782,391 B1 * | 8/2004 | Scher | 707/603 |
| 7,353,534 B2 | 4/2008 | Stephens | |
| 2002/0138487 A1 | 9/2002 | Weiss et al. | |
| 2003/0033298 A1 | 2/2003 | Sundaresan | |
| 2003/0046311 A1 * | 3/2003 | Baidya et al. | 707/200 |
| 2004/0010546 A1 * | 1/2004 | Klug et al. | 709/203 |
| 2004/0122926 A1 | 6/2004 | Moore et al. | |
| 2005/0038809 A1 | 2/2005 | Abajian et al. | |
| 2005/0060283 A1 * | 3/2005 | Petras et al. | 707/1 |
| 2005/0235343 A1 * | 10/2005 | Stephens | 726/6 |
| 2005/0267798 A1 | 12/2005 | Panara | |
| 2006/0064394 A1 * | 3/2006 | Dettinger et al. | 707/1 |
| 2006/0122974 A1 * | 6/2006 | Perisic | 707/3 |
| 2007/0050353 A1 | 3/2007 | Ekberg et al. | |
| 2007/0067297 A1 * | 3/2007 | Kublickis | 707/9 |

(Continued)

FOREIGN PATENT DOCUMENTS

WO WO 01/46870 6/2001

OTHER PUBLICATIONS

Megan Vazey & Debbie Richards—"Achieving Rapid Knowledge Aequisition in a High-Volume Call Centre"—Proceedings of the Pacific Knowledge Acquisition—2004 (Citeseer) (pp. 1-15).*

(Continued)

*Primary Examiner* — John E Breene
*Assistant Examiner* — Anh Ly
(74) *Attorney, Agent, or Firm* — Fish & Richardson P.C.

(57) ABSTRACT

A computer-implemented method and system for performing a trusted search is described. A credibility score is assigned to a Web site based on whether the Web site meets at least a portion of trust criteria. The Web site is stored in an index of trusted Web sites if the credibility score assigned to the Web site is within a predefined range of credibility scores. The Web site is displayed on a machine if the Web site is determined to contain information that is relevant to a search query.

17 Claims, 5 Drawing Sheets

U.S. PATENT DOCUMENTS

| | | | |
|---|---|---|---|
| 2007/0074125 | A1 | 3/2007 | Platt et al. |
| 2007/0100803 | A1 | 5/2007 | Cava |
| 2007/0129999 | A1 | 6/2007 | Zhou et al. |
| 2007/0203906 | A1* | 8/2007 | Cone et al. ................. 707/6 |
| 2007/0244900 | A1 | 10/2007 | Hopkins et al. |
| 2007/0266306 | A1 | 11/2007 | Koppel et al. |
| 2008/0109473 | A1 | 5/2008 | Dixon et al. |
| 2010/0070510 | A1* | 3/2010 | Agarwal et al. ............ 707/748 |

OTHER PUBLICATIONS

Stuart Kurkowski, Tracy Camp and Michael Culagrosso—"MANET Simulation Studies: The Incredibles"—ACM SIGMOBILE mobile Computing and Communications Review, vol. 9, issue 4, Oct. 2005, (pp. 50-61:1-12).*

Toms et al., "Measuring User Perceptions of Web Site Reputation," Information Processing and Management 40 (2004), pp. 291-317.

Communication from a foreign patent office in a counterpart application (Extended European Search Report from EP 06 02 2747), May 23, 2007.

* cited by examiner

FIG. 2c though the number 50
of URLs retrieved by the search engine is very large. There-
METHOD AND SYSTEM FOR PERFORMING A SEARCH ON A NETWORK

CROSS-REFERENCE TO RELATED APPLICATION

This patent application is a continuation and claims priority under 35 U.S.C. §120 to U.S. patent application Ser. No. 11/590,248, now U.S. Pat. No. 7,606,809, filed on Oct. 31, 2006, which in turn claims priority to U.S. Provisional Application No. 60/732,435, which was filed on Nov. 1, 2005. The contents of U.S. Provisional Application No. 60/732,435 and U.S. Pat. No. 7,606,809 are hereby each incorporated by reference into this application as if set forth herein in full.

TECHNICAL FIELD

This disclosure relates to performing a search on a network, and more particularly to searching the World Wide Web using a search engine.

BACKGROUND

A Web site is a directory of files stored on a server or several servers that may be accessed by a client over a network (e.g., the Internet). A Web site contains one or more hypertext markup language (HTML) files called Web pages that are often related or linked to each other. Additionally, a Web site may also contain other types of files such as text files, pictures, movies, sound clips, and so forth. The World Wide Web (Web) is a collection of Web sites whose servers are connected to the Internet. Each Web site in the Web has a unique address, referred to as a universal resource locator (URL), which indicates the protocol required for accessing the Web site and the Internet protocol (IP) address or domain hosting the Web site.

Though the Web contains a vast wealth of information on most every topic imaginable, finding specific information quickly on the Web can be a daunting task. To help with this problem, programs called "search engines" enable users to navigate through the myriad of Web sites on the Web to find the information that they want. A search engine typically has a graphical user interface (GUI) in which a user enters a search query. A search query may include one or more keywords, words to exclude, a phrase, or a sentence. A search query may also specify a language, acceptable file formats, dates, and occurrences of keywords. After receiving a search query, the search engine sorts an index of Web sites and returns a list of URLs of Web sites that are relevant to the search query. A user may become overwhelmed if the number of URLs retrieved by the search engine is very large. Therefore, the user may wish to limit the search results to those Web sites that the user knows and trusts.

SUMMARY

This application describes methods and systems, including computer program products, for performing a trusted search. In general, in one aspect, the application describes a computer-implemented method including assigning a credibility score to a Web site based on whether the Web site meets at least a portion of trust criteria, storing the Web site in an index of trusted Web sites if the credibility score assigned to the Web site is within a predefined range of credibility scores, and displaying the Web site on a machine if the Web site is determined to contain information that is relevant to a search query.

Embodiments may include one or more of the following. The Web site is displayed on the machine only if the credibility score of the Web site lies within a confidence range of credibility scores in which the confidence range includes a portion of the predetermined range. The confidence range may include a maximum credibility score of the predefined range of credibility scores. The confidence range may be set to a default value or adjusted from a user interface. The trust criteria may include a domain or an endorsement from an authoritative source. The trust criteria may be based on metrics data derived from an Internet audience measurement tool or based on data derived from at least one online survey. A mathematical formula may be applied to at least one input parameter value representing whether the Web site meets at least a portion of the trust criteria.

In general, in another aspect, the application describes a system for performing a trusted search. The system includes a storage device configured to store an index of trusted Web sites and a server. The server includes a processor configured to calculate a credibility score of a Web site based on whether the Web site meets at least a portion of trust criteria. The server is configured to store the Web site in the index of trusted Web sites if the credibility score assigned to the Web site is within a predefined range. The server also includes a communication interface connecting the server to a network. The communication interface is configured to receive a search query and send an address corresponding to the Web site via the network.

Embodiments may include one or more of the following. A client may be connected to the network and configured to receive the address from the server via the network and to display the Web site in a graphical user interface. The network may be the Internet and the Web site may belong to the World Wide Web (WWW). The graphical user interface may provide an option to perform a trusted search and categories of the trust criteria to be applied to the trusted search.

The details of one or more embodiments are set forth in the accompanying drawings and the description below. Other features, objects, and advantages will be apparent from the description and drawings, and from the claims.

DESCRIPTION OF THE DRAWINGS

FIG. 1b is a block diagram of an exemplary server for use with the system of FIG. 1a.

FIG. 1c is a block diagram of an exemplary client for use with the system of FIG. 1a.

DETAILED DESCRIPTION

A search engine may perform a trusted search that returns a list of URLs of Web sites that a user associates with credibility or trust. A trusted search identifies whether a Web site may be considered a credible source of information based, for example, on whether the Web site meets at least a portion of various predetermined criteria, referred herein as "trust criteria." Trust criteria, for example, may include a trusted domain or a list of trusted domains whose Web sites are considered to be trustworthy. Examples of trusted domains include government domains (e.g., Web sites having URLs ending with ".gov"), university domains, regional domains, and the like. Trust criteria may also include an endorsement from an authoritative source, such as a well-known company or a famous person (e.g., a Good Housekeeping® seal of approval).

Trust criteria may be based on metrics data derived from Internet audience measurement tools such as Media Metrix®. For example, Web sites receiving an average number of visits that exceeds a minimum value of visits may be associated with trust. In another example, Web sites that are ranked as one of the top one-hundred most popular Web sites may be considered trustworthy sources. Trust criteria may also be derived from ah Internet voting mechanism (e.g., an anonymous user survey). For example, a Web site may be considered trustworthy if it receives an approval rating from at least one-hundred users who have visited the site and completed an online survey.

Figure 1A:
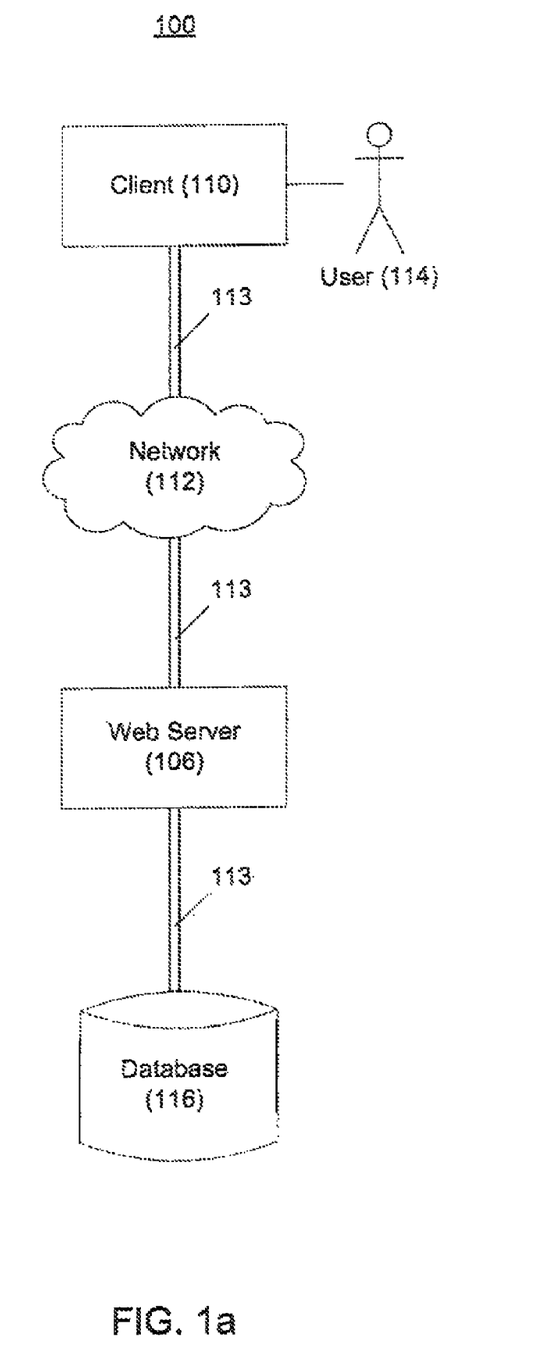
FIG. 1a is a block diagram of an exemplary system for performing a trusted search.
Figure 1B:
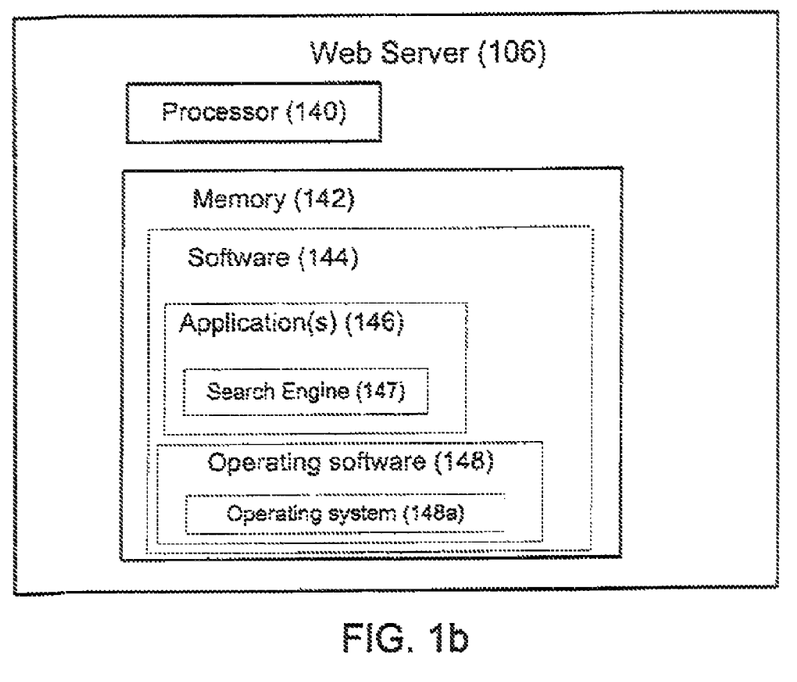
Figure 1C:
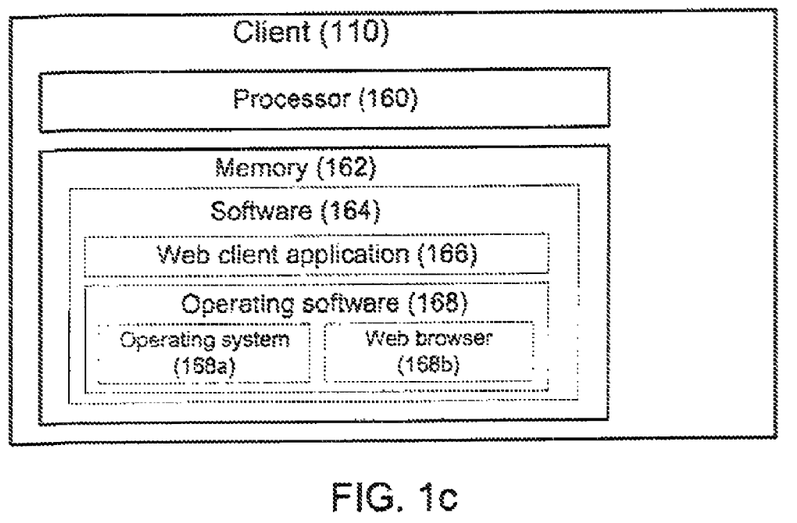

FIGS. 1a-1c illustrate an example of a system 100 for providing trusted search results (i.e., a list of URLs of trusted Web sites) to a user 114. System 100 includes a client 110 at which user 114 enters a search query, a database 116 for storing an index of Web sites, a Web server 106 for retrieving Web sites from the database 116, and a network 112 to which client 110 and Web server 106 are connected by communication links 113. Communication links 113 may include any kind or combination of modem links, Ethernet links, cables, point-to-point links, infrared connections, fiber optic links, wireless links, cellular links, satellite links, and other appropriate communication links.

Web server 106, also shown in FIG. 1b, may be any type of computing device including one or more processors, (referred to simply as "processor 140"), and memory 142 for storing software 144. Processor 140 executes software 144, which includes operating software 148 and one or more applications 146 including search engine 147. Operating software 148 includes, but is not limited to, an operating system 148a and one or more routines for effecting communication over network 112.

Network 112 may be a local area network (LAN), a larger group of interconnected systems such as the Internet, a private intranet, or other similar wired or wireless networks. The network may include component networks, communication links proxy servers, firewalls or other security mechanisms, internet service providers (ISPs), gatekeepers, gateways, switches, routers, hubs, client terminals, and other network elements.

Database 116 may be used by Web server 106 for storing an index of Web sites, search queries, trusted-content filters, trust criteria, and other data that may be used to perform a trusted search. Database 116 may be a single database or a collection of databases. Database 116 may be stored in Web server 106 or reside externally to Web server 106 on one or more machines connected to Web server 106 either directly or via network 112.

Client 110, also shown in FIG. 1b, may be any type of Web-enabled apparatus or system. Examples of such apparatuses or systems include, but are not limited to, a desktop computer, a laptop computer, a mainframe computer, a cellular telephone, a personal digital assistant ("PDA"), and a controller embedded in an otherwise non-computing device. Client 110 contains one or more processor(s) 160 (referred to simply as "processor 160") and memory 162 for storing software 164. Processor 160 executes software 164, which includes a Web client application 166 and operating software 168. The Web client application 166 includes one or more routines used in implementing the Transmission Control Protocol and the Internet Protocol (TCP/IP), which allows client 110 to communicate over network 112. Operating software 168 may include operating system 168a, which may include Windows XP®, a Web browser 168b, such as Internet Explorer®, and other various application programs.

Using Web browser 168b, user 114 may access search engine 147 from Web server 106. Search engine 147 includes a graphical user interface (GUI) through which a search input may be entered and search results may be displayed to user 114. A search input includes a search query and may also include an option to perform a trusted search. A search input may also allow user 114 to select trust criteria to be applied to a search.

In one exemplary implementation, a credibility score is assigned to an index of Web sites. A credibility score may be, for example, a value that represents a level of credibility on a graduated scale (e.g., a scale of values of one through ten in which a value of ten signifies a highest level of credibility and a value of one signifies a lowest level of credibility or no credibility). A credibility score for a Web site may be determined algorithmically, heuristically, or using other forms of analysis. An algorithmically-derived credibility score may be an output of a mathematical formula that applies an operation or series of operations to a set of input parameters that represents whether or not the Web site meets at least a portion of the trust criteria. For example, an input parameter may have a value of one if the Web site meets a particular category of trust criteria or a value of zero if the Web site does not meet the criteria. A credibility score for the Web site is then determined from a formula that operates on the input parameter values. The formula may, for example, sum the input parameters. Thus if five categories of trust criteria are applied to a Web site and the Web site adheres to three out of the five categories, the Web site is assigned a score of three out of five, with five being the maximum credibility score possible. The formula could also be a weighted sum of input parameter values in which the weights represent a significance of adhering to a category of criteria and scales the input parameter values accordingly. For example, adherence to trust criteria that specifies a government source may be considered more relevant than adherence to a different trust criteria (e.g., a criteria that includes an endorsement by a company). Therefore, in this example, a larger weight is assigned to an input parameter value that represents adherence to a government source in comparison to a weight assigned to an input parameter that represents a company endorsement. Weights may be positive or negative values and may be determined heuristically or algorithmically. The formula may also apply other mathematical operations or functions, or any combination thereof; to the input parameter values.

Figure 2A:
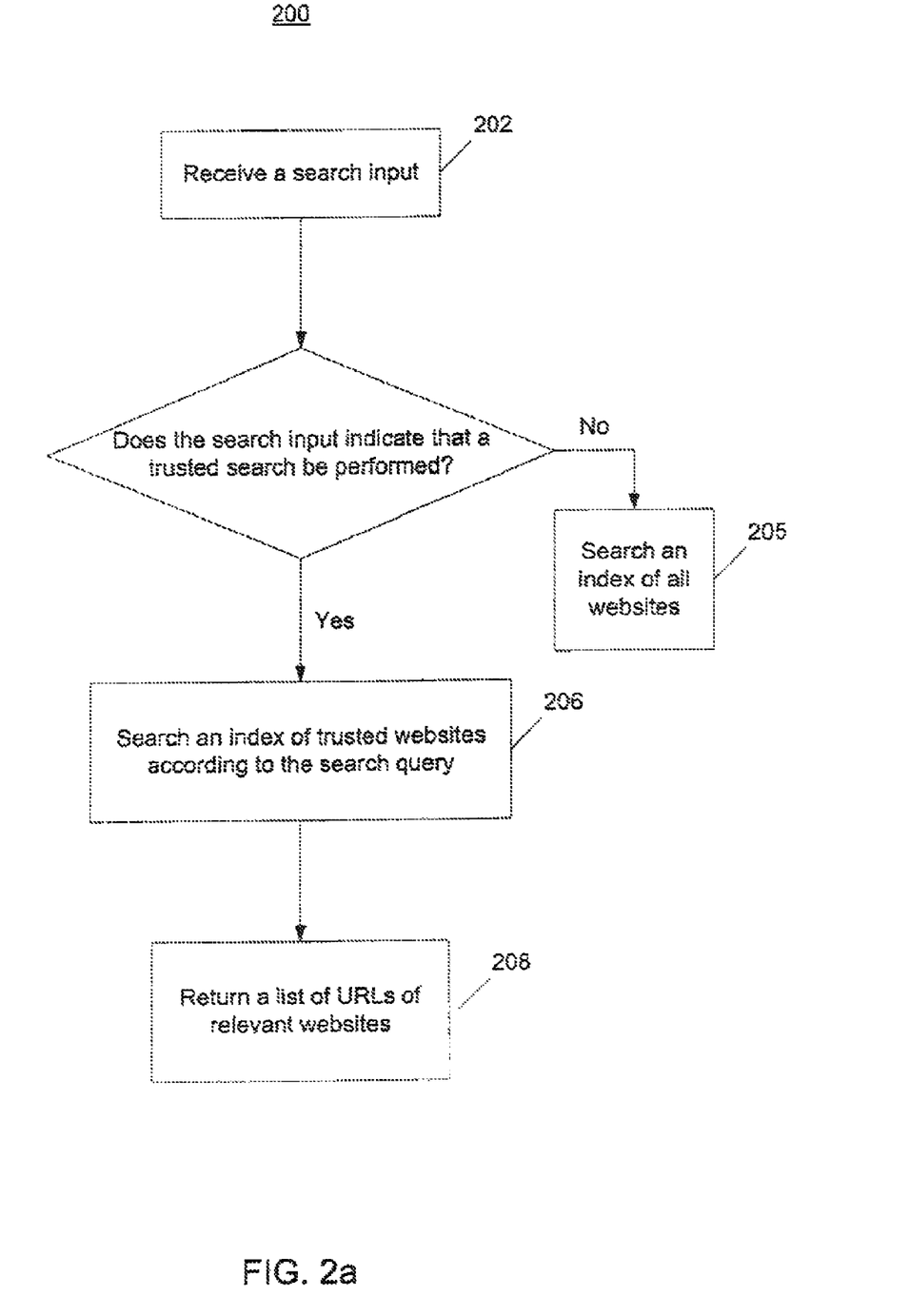
FIGS. 2a-2c are flowcharts of trusted searches.
Figure 2B:
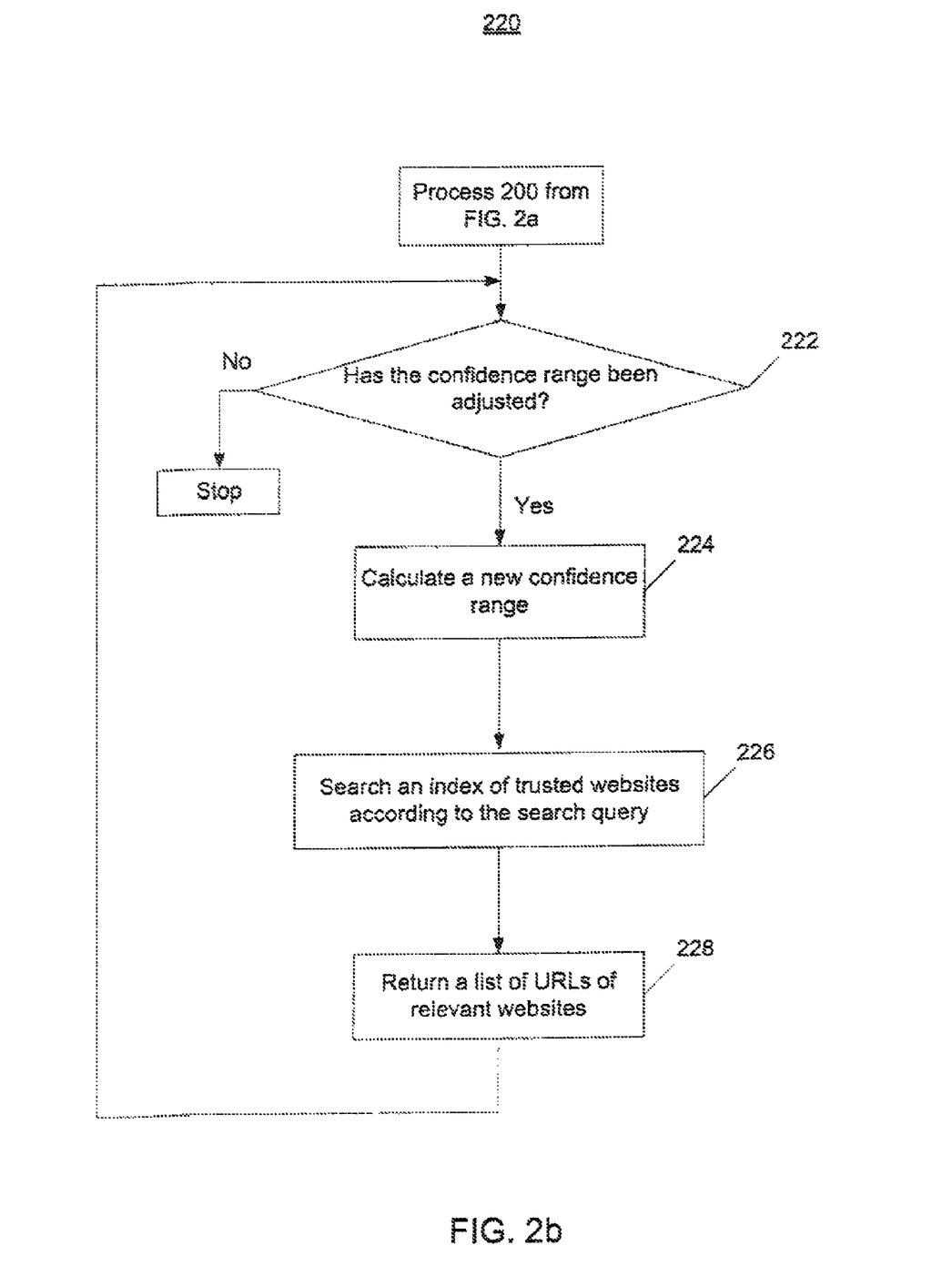
Figure 2C:
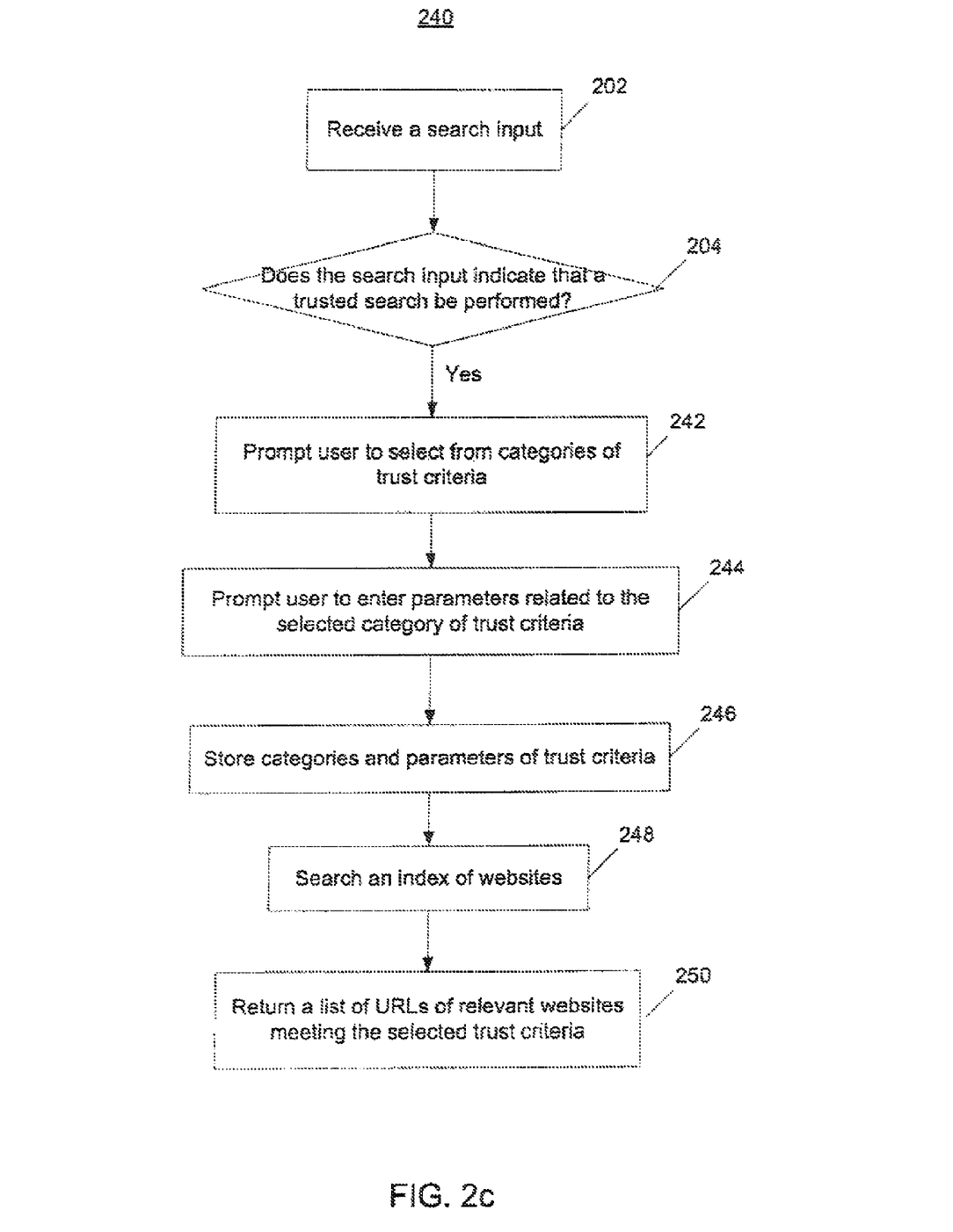

FIGS. 2a-2c describe three exemplary processes for providing trusted search results to user 114 using system 100 of FIG. 1a. In the exemplary process 200 shown in FIG. 2a, search engine 147 maintains an index of Web sites whose credibility scores are equal to or lie within a predefined range of a maximum credibility score. Such an index is referred to as an "index of trusted Web sites." When user 114 requests that a trusted search be performed, search engine 147 searches only those Web sites contained in the index of trusted Web sites. The index of trusted Web sites may also include other indexes of trusted Web sites maintained by third-party authoritative sources. Examples of third-party authoritative sources include individuals or companies that rate or recommend Web sites, online surveys, and audience measurement tools.

When search engine 147 performs a trusted search of the Web sites contained in the index of trusted Web sites that are relevant to the search query, only those Web sites whose credibility scores fall within a range of a maximum credibility score are returned to user 114. Such a range is referred to as a "confidence range." The confidence range may be a default value determined at the backend of search engine application 147. The confidence range may equal the predefined range (i.e., all relevant Web sites contained within the index of trusted Web sites would be returned) or a subset of the predefined range.

Process 200 begins when Web server 106 receives (202) a search input from user 114. The search input includes a search query that may include keywords, phrases, and other input that describe a content of the search. The search input may also include a request to perform a trusted search. If the search input specifies that a trusted search be performed (204), search engine 147 searches an index of trusted Web sites (206) according to the search query and returns (208) a list of URLs of relevant Web sites whose credibility scores lie within a default confidence range. If the search input does not specify that a trusted search be performed (204), search engine 147 searches an index of all Web sites (205).

FIG. 2b shows an example of a process 220 for performing a trusted search that is based on process 200. In process 220, however, user 114 may adjust the confidence range to expand or reduce the number of trusted search results returned in process 200. For example, user 114 may increase the number of results returned by an initial trusted search by expanding the confidence range to include credibility scores that lie outside the default confidence range. Likewise, user 114 may reduce the confidence range so that fewer results are returned.

Process 220 includes the receiving (202), searching (206), and returning (208) procedures of process 200 shown in FIG. 2a. After an initial list of search results are returned (208) to user 114, process 220 determines if user 114 has adjusted the confidence range (222). To adjust the confidence range, user 114 may manipulate an icon in the search engine GUI. For example, the icon may be a slider bar having a slider that can be moved along a bar. The bar represents a range between a maximum and minimum credibility scores corresponding, to the opposite ends of the bar. The position of the slider on the bar represents a value in the range. In one example, the top of the confidence range is set by default to the maximum possible credibility score and the bottom of the confidence range corresponds to the position of the slider. In another example, the slider bar may contain two sliders for allowing user 114 to set both the top and the bottom of the confidence range. For example, the confidence range may be adjusted to span the middle third of the range between the maximum and the minimum credibility scores by positioning each of the sliders at a distance of one-third of the bar length from the opposite ends of the bar.

If a change in the confidence range is determined (222), a new confidence range is calculated (224). Search engine 147 searches the index of trusted Web sites (226) according to the initial search query and returns (228) URLs of Web sites whose credibility scores lie within the new confidence range. Determining (222), calculating (224), and searching (226) may be repeated to fine-tune the number of returned results.

FIG. 2c shows an exemplary process 240 for performing a trusted search in which user 114 selects trust criteria to be applied to a search. In one implementation, user 114 may select from a list of categories of trust criteria provided in the search engine GUI. User 114 may select one, all, or any subset of the categories of search criteria. User 114 may also specify or adjust one or more parameters within one or more selected categories of trust criteria.

Process 240 begins when Web server 106 receives (202) a search input from user 114. The search input includes a standard query such as keywords, phrases, and other input that describe the content of the search. The search input may also include a request to perform a trusted search. If the search input specifies a trusted search (204), search engine 147 prompts (242) user 114 to select from categories of trust criteria. Categories of trust criteria may include "Web site domain", "popularity", "endorsement", "user reviewed", and any other similar categories of criteria. Search engine 147 may also prompt (244) user 114 to enter any parameters related to the selected category. For example, upon selecting "Web site domain" user 114 may enter domains of Web sites that user 114 associates with credibility. If user 114, for example, selects trust criteria based on "popularity," user 114 may specify a desired minimum, maximum, or range of hits (where a hit is a single file request in an access log of a Web server). In another example, user 114 may specify a popularity ranking that lies within a selected range (e.g., the top one-hundred most popular Web sites) in a selected Web site category (e.g., science, medicine, entertainment, news, business, etc.) evaluated by a selected audience measurement tool (e.g. Media Metrix®). If user 114 selects an "endorsement" category of trust criteria, for example, search engine 147 may prompt user 114 to enter the names of authoritative sources or select from a list of authoritative sources from which endorsements constitute trust criteria. If user 114 selects a "user reviewed" category of trust criteria, search engine 147 may, for example, prompt user 114 to enter a minimum number of user reviews and a minimum percentage of positive reviews to be applied as trust criteria. The categories of trust criteria and their parameters are stored in memory (246). Search engine 147 applies (248) the selected trust criteria to an index of Web sites and returns (250) a list of URLs of relevant Web sites meeting the selected trust criteria. In one exemplary implementation, the trust criteria are applied using a predefined algorithm that is hard-coded into search engine 147.

In another exemplary implementation, search engine 147 prompts user 114 to specify how the selected trust criteria is applied to a search. For example, user 114 may specify that in order for a Web site to be trusted (and thus displayed), the Web site must meet a minimum number or range of trust criteria from the selected categories of trust criteria. For example, user 114 may select four categories of trust criteria to be applied to a trusted search and specify that adherence to at least two out of the four categories qualities a Web site to be trusted.

The processes described herein can be implemented in digital electronic circuitry, or in computer hardware, firmware, software, or in combinations of them. The processes can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing a computer program to perform functions of the processes by operating on input data and generating an output. Actions can also be performed by, and apparatus for performing the processes can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments have been described. Nevertheless, it will be understood that various modifications may be made. For example, user 114 may adjust the total number of Web sites to be displayed for a trusted search. In another exemplary embodiment, user 114 may view only the Web sites having credibility scores that lie outside of the confidence range. Accordingly, other embodiments are within the scope of the following claims.

What is claimed is:

1. A computer-implemented method comprising:
receiving a selection of one or more trust criteria;
determining that a web site satisfies at least a portion of the one or more trust criteria;
assigning, based on at least the portion of the one or more trust criteria, a credibility score to the web site, wherein the credibility score is within a predefined range of credibility scores;
receiving a search input from a computer device;
determining that the web site comprises information that this relevant to the search input and that the credibility score is within a confidence range of credibility scores, wherein the confidence range comprises a portion of the predefined range;
wherein the confidence range comprises the credibility score with an increased value relative to other values of other credibility scores in the predefined range of the credibility scores; and
sending, to the computer device, information for displaying the web site.

2. The computer-implemented method of claim 1, further comprising:
generating a prompt for entry of parameters related to the selection of the one or more trust criteria.

3. The computer-implemented method of claim 1, further comprising setting the confidence range to a default value.

4. The computer-implemented method of claim 1, further comprising adjusting the confidence range from a user interface.

5. The computer-implemented method of claim 1, wherein the one or more trust criteria comprise a domain.

6. The computer-implemented method of claim 1, wherein the one or more trust criteria comprise an endorsement from an authoritative source.

7. The computer-implemented method of claim 1, wherein the one or more trust criteria are based on metrics data derived from an Internet audience measurement tool.

8. The computer-implemented method of claim 1, wherein the one or more trust criteria are based on data derived from at least one online survey.

9. The computer-implemented method of claim 1, wherein assigning the credibility score comprises applying a mathematical formula to at least one input parameter value representing whether the web site meets at least a portion of the one or more trust criteria.

10. A system comprising:
one or more processors; and
one or more machine-readable storage devices configured to store instructions that are executable by the one or more processors to perform operations comprising:
receiving a selection of one or more trust criteria;
determining that a web site satisfies at least a portion of the one or more trust criteria;
assigning, based on at least the portion of the one or more trust criteria, a credibility score to the web site, wherein the credibility score is within a predefined range of credibility scores;
receiving a search input from a computer device;
determining that the web site comprises information that this relevant to the search input and that the credibility score is within a confidence range of credibility scores, wherein the confidence range comprises a portion of the predefined range;
wherein the confidence range comprises the credibility score with an increased value relative to other values of other credibility scores in the predefined range of the credibility scores; and
sending, to the computer device, information for displaying the web site.

11. The system of claim 10, wherein the operations further comprise:
generating a prompt for entry of parameters related to the selection of the one or more trust criteria.

12. The system of claim 11, wherein the operations further comprise:
generating graphical user interface that provides an option to perform a trusted search.

13. The system of claim 12, wherein the graphical user interface provides categories of the one or more trust criteria to be applied to the trusted search.

14. One or more machine-readable storage devices configured to store instructions that are executable by one or more processors to perform operations comprising:
receiving a selection of one or more trust criteria;
determining that a web site satisfies at least a portion of the one or more trust criteria;
assigning, based on at least the portion of the one or more trust criteria, a credibility score to the web site, wherein the credibility score is within a predefined range of credibility scores;
receiving a search input from a computer device;
determining that the web site comprises information that this relevant to the search input and that the credibility score is within a confidence range of credibility scores, wherein the confidence range comprises a portion of the predefined range;
wherein the confidence range comprises the credibility score with an increased value relative to other values of other credibility scores in the predefined range of the credibility scores; and
sending, to the computer device, information for displaying the web site.

15. The one or more machine-readable storage devices of claim 14, wherein the operations further comprise:

generating a prompt for entry of parameters related to the selection of the one or more trust criteria.

16. The one or more machine-readable storage devices of claim 14, wherein assigning the credibility score comprises:
applying a mathematical formula to at least one input parameter value representing whether the web site meets at least a portion of the one or more trust criteria.

17. The one or more machine-readable storage devices of claim 14, wherein the operations further comprise:
generating a prompt for entry of parameters related to the selection of the one or more trust criteria.

* * * * *

UNITED STATES PATENT AND TRADEMARK OFFICE
CERTIFICATE OF CORRECTION

| | |
|---|---|
| PATENT NO. | : 8,171,009 B2 |
| APPLICATION NO. | : 12/556046 |
| DATED | : May 1, 2012 |
| INVENTOR(S) | : Adam Soroca |

It is certified that error appears in the above-identified patent and that said Letters Patent is hereby corrected as shown below:

On the first page of the Issued Patent, Column 2, under "Other Publications," delete "Aequisition" and insert --Acquisition--, therefor.

Signed and Sealed this
Tenth Day of July, 2012

David J. Kappos
*Director of the United States Patent and Trademark Office*